2 Sheets—Sheet 1.

W. STEELE.
MACHINE FOR CUTTING AND DRESSING HOOPS.

No. 184,308. Patented Nov. 14, 1876.

Witnesses:

Inventor:
Wm. Steele

2 Sheets—Sheet 2.

W. STEELE.
MACHINE FOR CUTTING AND DRESSING HOOPS.

No. 184,308. Patented Nov. 14, 1876.

Witnesses: Inventor:
F. Cain Wm. Steele
W. C. Barrick

UNITED STATES PATENT OFFICE.

WILLIAM STEELE, OF ST. MARY'S, WEST VIRGINIA.

IMPROVEMENT IN MACHINES FOR CUTTING AND DRESSING HOOPS.

Specification forming part of Letters Patent No. 184,308, dated November 14, 1876; application filed July 10, 1876.

*To all whom it may concern:*

Be it known that I, W. STEELE, of the town of St. Mary's, in the county of Pleasants, in the State of West Virginia, have invented certain new and useful Improvements in Machines for Cutting and Dressing Hoops, of which the following is a specification:

The first part of my invention consists in combining and arranging certain devices with revolving planers and a circular saw, in such a manner that a hoop can be dressed to the proper shape, and separated from the log at the same operation, and also to make a hoop at each motion of the carriage forward or backward.

The second feature of my invention consists in combining and arranging certain devices with a head-block for carrying the log in such a manner that the log will be automatically revolved and moved up the proper distance for the width and thickness of a hoop, as it is being worked up.

The object of my invention is the saving of both time and timber in the manufacturing of hoops.

Figure 1:
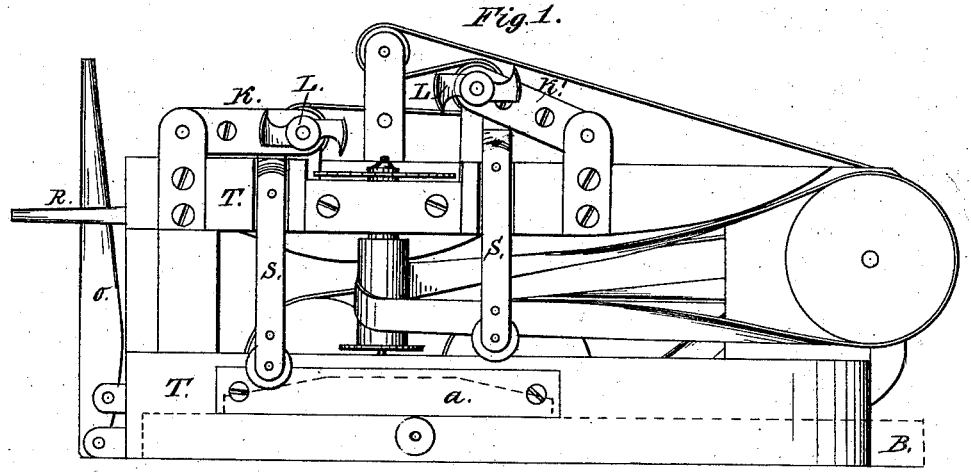
Figure 2:
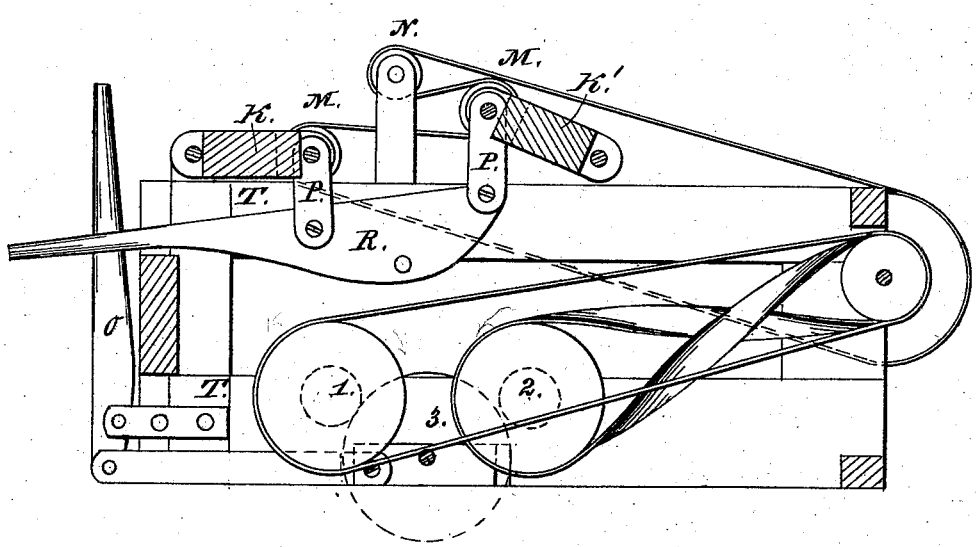
Figure 3:
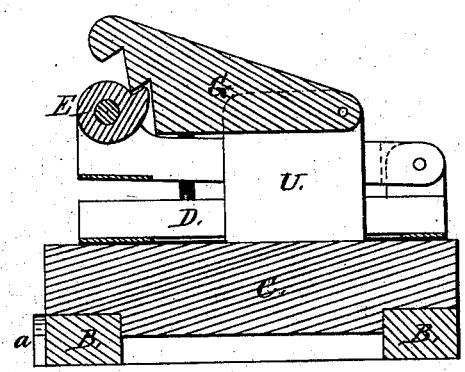
Figure 4:
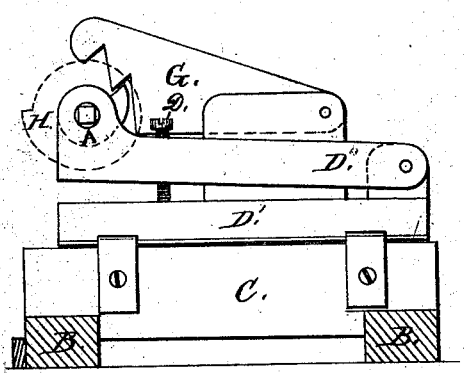
Figure 5:
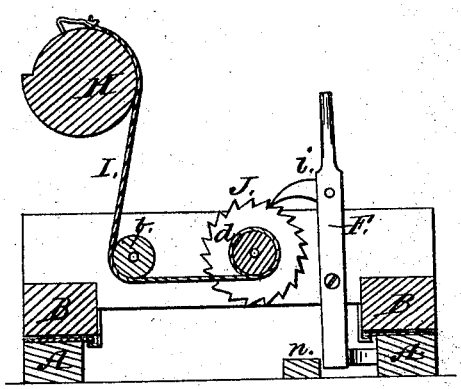

Figure 1 is a front elevation. Fig. 2 is a longitudinal section. Fig. 3 is a section of the head-block, showing the cams and stops which move the log up as the hoops are taken off. Fig. 4 shows the plan of the head-block. Fig. 5 shows the device for revolving the log the required distance to give the proper thickness to the hoop.

The working parts of my machine consist in the planer-heads L and L', which are hung on the frames K K', and operated by pulleys M M and tightening-pulley N. The frames K K' are hinged to the frame T, the other ends with the shafts which carry the cutter-heads, being adjustable by the lever R, which is connected to them by the links P P. The gage-bars S S' are pivoted at one end to the frames K K'. The other ends are provided with rollers resting on the pattern *a*, which is fastened on the side of the carriage B, a broken section of which is shown at Fig. 1, by the dotted lines. The saw is also hung to the frame T in a vertical position, so as to cut into the side of the log, and in a line parallel to its center. On the top of the saw is a cutter-head, D, the object of which is to dress the edge of the boards for house-siding, &c. The head-block which supports the log is in three parts, C D' D''. The part C is fastened to the carriage B. The parts D' D'' are grooved, and move at right angles to the carriage. The rear ends of the movable parts D' D'' are hinged together, and the front ends of parts D'' D'', on which are hung the shafts A A, which support the log, and on which are mounted the cams E, are regulated by set-screws, which raise or lower them, so as to bring the grain of the wood in a line with the cut of the saw. The stops G are pivoted at their rear ends to the braces U, which are attached to the permanent part C, and their front ends bear against the cams E.

The device for giving the revolving motion to the log, as represented by Fig. 5, is attached to the carriage B, and consists of the drum *d*, the ratchet J, lever F, pawl *i*, and dog-chain I.

Motion is given to the carriage by the friction-pulleys 1, 2, and 3, but it can be operated by any of the usual or well-known methods.

In working the machine, the log is hung on the shafts A A. The dog on the end of the chain I is driven into the surface of the log, as shown at Fig. 5. The heads D' D'' are then moved up until the saw will penetrate the log the desired width of the hoop. As motion is given to the carriage, the planer-frame K is brought down by the lever R until the bits come in contact with the log, taking off the surplus wood, the lower end of the gage-bar resting on the pattern. As the carriage moves forward, the pattern raises or lowers the cutter-head, so as to give the proper shape to the hoop. As the carriage moves out after the hoop has been cut off, the lever F comes in contact with a projection on the floor, which moves out the lower end of the lever F. The upper end, with the pawl, moves the ratchet and drum one notch, the dog-chain being fastened at one end to the drum, and the other to the log. As the drum is moved round, it revolves the log the proper distance for the thickness of the hoops.

The motion of the carriage and the planer-frames is then reversed by their respective levers, and the planer-head L is brought in contact with the log, thus taking off and dressing a hoop by the return motion of the carriage, and so alternately until the log is worked up, or the carriage may be returned without cutting a hoop, and not affect the working of the machine. As the log is revolved, the shafts on which it is hung, and on which are fastened the cams, revolves with it, the stops G being constructed with notches at the ends which bear against the cams E E, corresponding to the difference between the long and short parts of them. As the long part or wing of the cam passes, the stops drop down, and the next notch comes in contact with the short part, thus moving the head-block toward the saw and planers in a regular and uniform manner, so that at each revolution of the log it is moved the desired distance for the width of a hoop.

By changing the planer-bits I can also saw, dress, and rabbet house-siding at the same time, thus saving both time and timber in its manufacture. Therefore I do not confine my invention entirely to the manufacturing of hoops, as it is evident that it can be used for other purposes; but

What I claim, and desire to secure by Letters Patent, is—

1. The combination and arrangement of the frames K K', with the planer-heads L L', the gage-bars S S', the links P P, lever R, and pattern $a$, with the saw, substantially as described, and for the purpose set forth.

2. The adjustable head-block C D' D'', with the cams E E, stop G, brace U, ratchet J, drum $d$, and dog-chain I, combined and arranged in the manner and for the purpose set forth.

W. STEELE.

Witnesses:
Z. CAIN,
W. O. BARRICK.